(No Model.)

I. GOODMAN & L. F. WINTER.
CAKE AND CRACKER MACHINE.

No. 292,906. Patented Feb. 5, 1884.

WITNESSES:
Wm N Lowe
D J Morgan

INVENTOR
Isaac Goodman
Louis F. Winter
BY
A. P. Keyer
ATTORNEY

UNITED STATES PATENT OFFICE.

ISAAC GOODMAN AND LOUIS F. WINTER, OF NEW YORK, N. Y.

CAKE AND CRACKER MACHINE.

SPECIFICATION forming part of Letters Patent No. 292,906, dated February 5, 1884.

Application filed November 27, 1882. (No model.)

*To all whom it may concern:*

Be it known that we, ISAAC GOODMAN, a subject of the German Empire, and LOUIS F. WINTER, a citizen of the United States, both residents of New York city, in the county and State of New York, have invented new and useful Improvements in Cake and Cracker Machines, of which the following is a specification.
Our invention consists of an improvement in machines for forming dough into cakes and crackers preparatory to baking them, whereby the same may be accomplished more expeditiously, with less labor of attendance, and more cheaply than in the common way, the said improvement consisting of a series of kneading-rollers having progressively-increasing speed, for receiving the dough in a partially-kneaded condition from the preparatory kneading-machine and completing the operation by squeezing or pressing the dough and drawing out the sheet in advance of and preparatory to delivering it to rotary markers and cutters, which we employ in connection with the rotary kneading-rolls for continuous and rapid operation, and which we arrange on separate rollers to act separately and at different times on the dough-sheet, so that the dough will clear better, because there is less adherence of it to the devices separately than when the markers and cutters are arranged together on one roller, so as to act at the same time and in the same place on the dough.

Our improvement also consists of a clearing-rod arranged between the printing-roller and cutter-roller and over the endless apron, over which the dough-sheet is caused to pass for clearing the dough of the adherence to the apron that the printers may cause by pressing it thereon, all as hereinafter fully described, reference being made to the accompanying drawings, in which—

Figure 1:
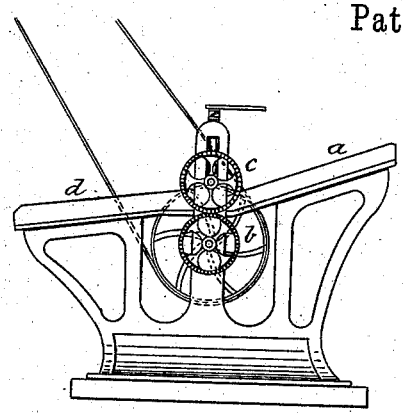
Figure 2:
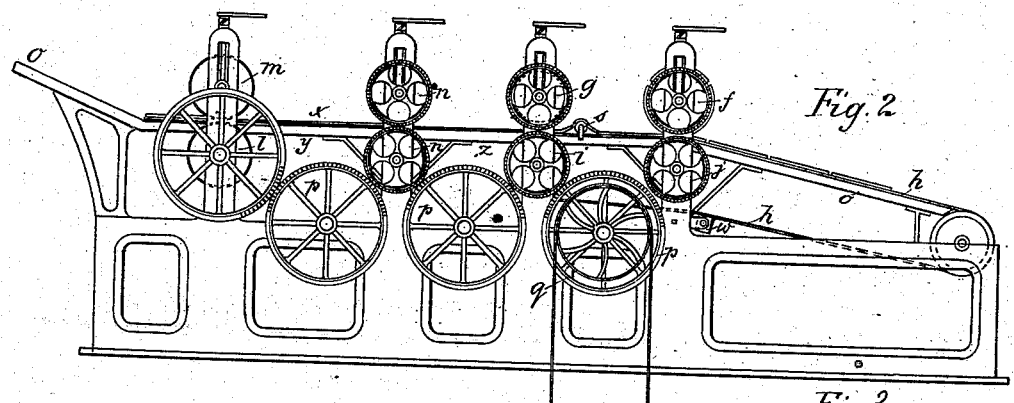
Figure 3:
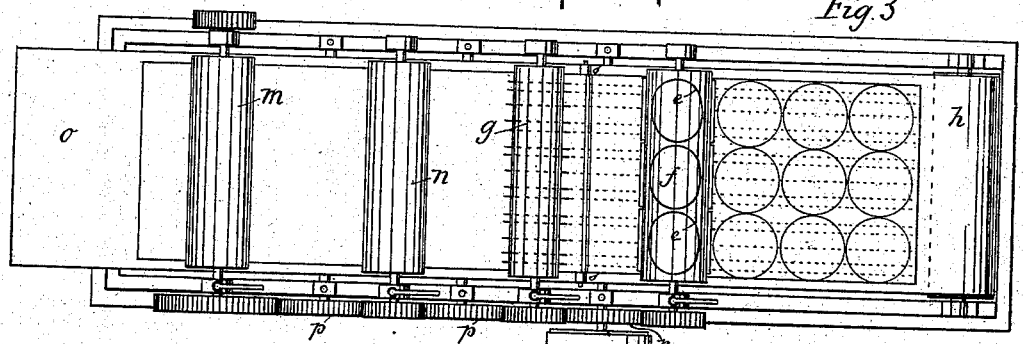
Figure 4:
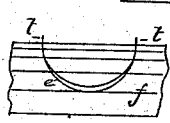
Figure 5:
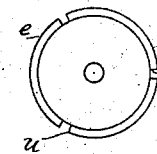

Figure 1 is a sectional elevation of a kneading-machine of the common sort, the same being here shown to illustrate more clearly the common method of procedure in the preparation of crackers and other cakes for the oven. Fig. 2 is a side view of our improved machine. Fig. 3 is a plan view, and Figs. 4 and 5 are details of the cutters.

In the common practice of the preparation of crackers, passover cakes, and other cakes for placing in the baking-pans preparatory to putting them in the oven, the dough is taken in balls or lumps from the mixer, in which the flour and water are properly mixed, and balled and placed on the table $a$ of the first or preparatory kneading-machine, where it is passed between the rolls $b$ and $c$, from which the dough issues in a flat sheet upon the apron $d$, whereon the attendant folds the sheet into a bunch of about three layers, and then returns the bunch to the table $a$, to be again passed between the rolls, repeating the operation two or more times, as may be required, to produce the required temper. He then passes the bunch to another similar kneading-machine, but adjusted for rolling down the bunch to a thinner sheet, by which it is finally prepared for the printing and cutting machine, to which the sheet is to be transferred from the said finishing-kneader.

We propose to employ endless cutters $e$, contrived to cut properly and discharge freely on the periphery of a roll, $f$, so that they may have continuous motion and high speed, using therewith a separate rotary printing-roll, $g$, having printing-markers independent of the cutters, with an endless carrier, $h$, passing between the printing and cutting rolls, and suitable carrying-rolls, $i$ and $j$, under them, and connecting therewith the secondary kneading-rolls $l\,m$ and a pair of intermediate kneading, drawing, and feeding rolls, $n$, whereby, after the primary kneading operation in the machine, Fig. 1, the bunch of dough may be placed directly on the table $o$, from which it will, without further attendance, be finally kneaded, marked, cut, and delivered on the descending portion of the carrier $h$, from which the cakes and the remnants of the dough-sheet will be taken by sliding a thin plate of metal under them and lifting them off upon a table, where the cakes will be separated from the waste and placed on the baking-pans, while the waste will be reworked into suitable sheets for cutting into cakes. The several rolls are to be geared with a train of idle-wheels, $p$, with one of which the driving-pulley $q$ may be connected for applying the power, the arrangement being such that the wheel $p$, by which the kneading-rolls $l\,m$ are driven, is mounted directly upon the shaft of roll $m$, while the others of the said train gear with the rolls $n$, $i$, and $j$, respectively, by pinions thereon of half the size of said wheels $p$, thus speeding them about double that of rolls $l\ m$, so that, beside the action of said rolls $l\ m$, rolls $n$ will draw and reduce the sheet of dough to about half the thickness of it when it issues from $l\ m$, besides feeding it to the printing-rolls. When the sheet issues from the printing-rolls $g\ i$, we cause it to pass over a rod, $s$, by which any tendency to stick on the endless carrier $h$ is prevented, said sheet falling back on the carrier and then passing between the cutting-rolls, where any slight adhesion of the dough to the carrier is favorable to the discharge of the cakes from the cutters; but care is taken in the construction of the cutters to provide the form most favorable for the discharge by making the sides to flare in the proper graduation from the parts $t$, perpendicular to the longitudinal surface, Fig. 4, to the parts $u$, radial to the circumference in Fig. 5, by which said cutters will enter the dough in the best lines throughout all their parts, for the least adhesion to them when escaping from it. At $w$ we arrange a scraper for the clearance of any dough that may adhere to the retaining side of the belt, said scraper consisting of a thin strip of sheet metal attached to any suitable supporting-bar, over which the carrier is to be stretched with the requisite tension for the purpose. From rolls $l\ m$ to $n$ and from rolls $n$ to $g\ i$ the dough-sheet $x$ passes over smooth stationary plates $y\ z$, respectively.

By the self-clearing or discharging quality of these cutters, and especially by using the printers separately from the cutters, an important advantage is gained in the avoidance of the use of the dischargers that have to be employed to press or push out the cakes from the combined printers and cutters, which are objectionable, because they compress the dough to such extent as to prevent the light, flaky character of the crust that is obtained when such pushers are not used, and they materially complicate the machine and add to the cost.

Having thus described our invention, what we claim, and desire to secure by Letters Patent, is—

1. The combination, in a cracker and cake machine, substantially as hereinbefore set forth, of a pair of kneading-rolls, $l\ m$, a pair of kneading, drawing, and delivering rolls, $n\ n$, having greater speed than rolls $l\ m$, a pair of printing-rolls, $g\ i$, a pair of cutting-rolls, $f\ j$, having endless cutters, substantially as described, the stationary plates $y\ z$ between the kneading and printing rolls, respectively, the endless carrier $h$ between the printing and cutting rolls, and connecting and actuating mechanism, substantially as described.

2. In a cracker-machine, the combination of the printing-rolls $g\ i$, endless carrier $h$, stripping-rod $s$, the cutting-rolls $f\ j$, and connecting and operating mechanism, substantially as described.

In witness whereof we have hereunto signed our names in the presence of two subscribing witnesses.

ISAAC GOODMAN.
LOUIS F. WINTER.

Witnesses:
W. J. MORGAN,
S. H. MORGAN.